May 8, 1951  R. L. JAESCHKE  2,551,839
SATURABLE REACTOR TYPE REGULATOR
Filed June 9, 1949

Ralph L. Jaeschke,
Inventor.
Haynes and Koenig
Attorneys.

Patented May 8, 1951

2,551,839

UNITED STATES PATENT OFFICE 2,551,839

SATURABLE REACTOR TYPE REGULATOR

Ralph L. Jaeschke, Kenosha, Wis., assignor to Dynamatic Corporation, Kenosha, Wis., a corporation of Delaware Application June 9, 1949, Serial No. 98,151

10 Claims. (Cl. 172—284)

This invention relates to a regulator of the saturable reactor type having a wide output range.

The invention provides a saturable reactor regulator adapted to have a minimum output voltage closely approaching zero. In general, the regulator comprises a saturable reactor having a main winding and a control winding. Alternating current is fed through the main winding to a load. The reactor operates as an inductive impedance varying inversely with excitation of the control winding, which consequently controls the load voltage and current. A capacitance is paralleled across the reactor main winding for purposes of power factor correction. A relatively low impedance is connected to by-pass current around the load and reduces the output voltage at the load substantially to zero when the control winding is not excited. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
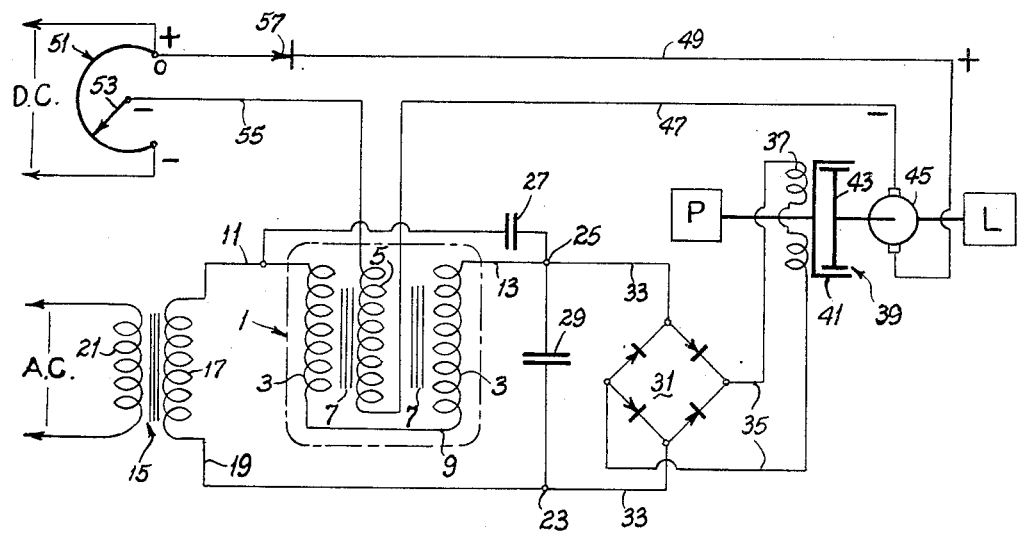
Figure 2:
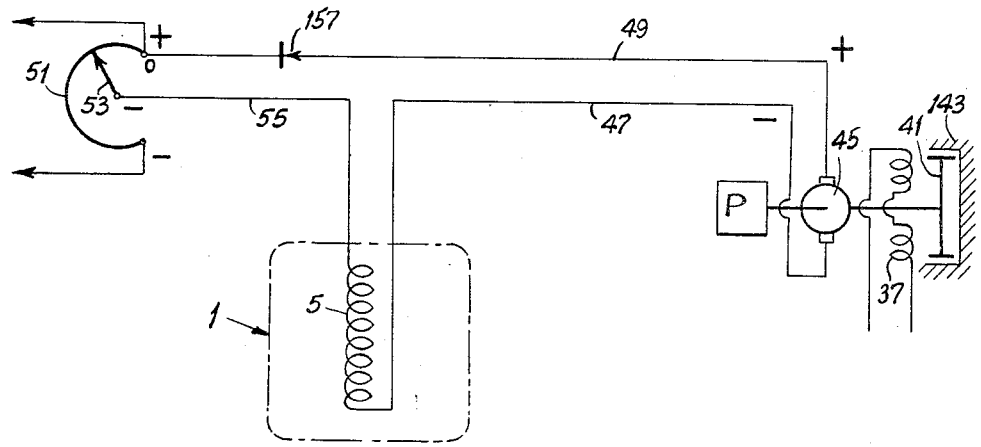

In the accompanying drawings, in which several of various possible embodiments of the invention are illustrated, Fig. 1 is a circuit diagram of the invention illustrating its application to speed regulation of an eddy-current clutch; and, Fig. 2 is a partial circuit diagram illustrating an embodiment of the invention for speed regulation of an eddy-current brake.

Similar reference characters indicate corresponding parts throughout the several views of the drawings.

Heretofore, considerable difficulty has been experienced in adapting a saturable reactor to control purposes when the output must necessarily vary over a considerable range, and more particularly down to low minimum values. Even the best saturable reactors have a 10 to 1 current range, i. e., a regulator with maximum output of 100 volts would have a minimum 10 volt output with no excitation of the control winding. By means of this invention, it is possible to reduce the minimum output to values as low as .05 volt.

Referring to the drawings, the regulator of this invention is shown to comprise a saturable core reactor, generally designated 1 and enclosed within dotted lines. The reactor has main windings 3 and a control winding 5 on a saturable core indicated at 7. The windings 3 are joined in series at 9 and have leads 11 and 13 extending from the reactor. Alternating current is fed through the reactor from a source including a transformer 15 having its secondary 17 connected to the lead 11 and to a line 19. The transformer primary 21 is energized in a customary manner as by connections to A. C. power lines. Line 19 leads to one output terminal 23 of the regulator and lead 13, from windings 3, leads to the other output terminal 25. Terminals 23 and 25 connect with a load or load circuit to be described hereinafter.

The above described elements of the regulator operate to supply a variable output voltage. Transformer 15 impresses a substantially constant amplitude A. C. voltage across lead 11 and line 19. This voltage in turn results in a certain current flow dependent upon the impedance of the reactor and the impedance of the load, the latter generally being constant. The internal resistance of the transformer has a nominal effect which may be ignored. The impedance of the reactor is determined within limits by the D. C. excitation of the control winding 5 and the attendant effect upon core saturation. When the core 7 is saturated by full excitation of winding 5, the windings 3 have a minimum impedance and a maximum voltage is impressed across the load. When no current is supplied to winding 5, the effective impedance of the reactor is at maximum value and a minimum load voltage results. The upper and lower impedances of the reactor limit its effectiveness as a regulator. Thus, a certain value of current is passed through the load when a simple saturable reactor is employed as a regulator, even though the control winding has zero excitation.

Referring again to the drawings, a capacitor 27 is connected in parallel across the reactor main windings 3 by connection to leads 11 and 13. The capacitor 27 is for correcting the power factor to or towards unity when control winding 5 is at zero excitation. Expressed in other words, the capacitance is of a value such that the reactive impedance of capacitor 27 is substantially equal to the reactive impedance of windings 3 at the minimum output occurring when winding 5 is not excited. This condition of parallel resonance (or antiresonance as it is sometimes known) substantially blocks flow of current. The capacitor 27 is generally relatively small, for example, of the order of 1 mfd. for a 100 volt 300 watt saturable reactor.

A second capacitor 29 is connected between terminals 23 and 25 in parallel with the load and in series with the paralleled elements 3 and 27. Capacitor 29 is of a relatively large value so that it has a low impedance which is largely reactive. As the impedance across the load is reduced, the voltage drop across it is reduced. Thus, it is desirable to have as large a capacitance as is economically feasible. A value of 20 mfd. has been found to be satisfactory for the aforementioned 300 watt unit. The impedance 29 acts to by-pass around the relatively larger impedance of the load such A. C. current as is largely a component of reactor current not blocked by the parallel resonant elements 3 and 27.

The load or load circuit includes a bridge rectifier 31 having its input connected by leads 33 across the regulator output terminals 23 and 25. The output of the rectifier is fed through leads 35 to a field coil 37 for an eddy-current slip coupling or clutch diagrammatically indicated at 39. A driving member 41 is directly driven by a prime mover P. A magnetically coupled driven member 43 completes the power delivery to the load L. The magnetic coupling is provided by the field winding 37. Coupled to the driven member 43 is a speed responsive voltage source consisting of a D. C. generator 45, having output lines 47 and 49. The polarity is arranged so that line 49 is positive with respect to line 47, the latter connecting with one end of the control winding 5.

There is also provided an adjustable D. C. reference voltage source consisting of a voltage divider 51 connected to a substantially constant D. C. voltage source. Line 49 connects with the positive terminal of the voltage divider. The circuit is completed through adjusting arm 53 and a connection 55 to the control winding. Thus, the reference voltage and the speed responsive voltage are in opposition, the differential being applied to the control winding.

In the application of the regulator for control of a clutch as illustrated in Fig. 1, the reference voltage is adjusted to overcome the speed responsive voltage. Therefore, a current determined by the voltage differential flows through lines 47 and 49 in a counterclockwise direction (electron theory). An electron valve or rectifier 57 is inserted in the control winding circuit to prevent reversal of current flow. The directional arrow of the valve indicates current flow under the conventional theory which is opposite to the electron theory.

Operation is as follows:

Initially pointer 53 is at the 0 position so that no current is supplied to control winding 5. Generator 45 is relatively stationary as no current is supplied to the field coil 37. Furthermore, the valve 57 prevents the current from flowing if the generator output is greater than the voltage from the voltage divider 51. In this condition the reactive impedances of capacitor 27 and windings 3 are such as to substantially block flow of current to the load. The current that is not blocked is substantially shorted around the load by the low impedance of capacitor 29.

To apply load or torque at the coupling, pointer arm 53 is moved away from the 0 position, thereby feeding current to the control winding 5. Excitation of winding 5 reduces the impedance of the main windings 3 to permit flow of current therethrough. The increased current produces a greater voltage across the load, particularly the bridge rectifier, and the excitation of field coil 37 is brought up to a substantial amount. The magnetic coupling is tightened and the generator begins to develop an increased countervoltage. The dynamic condition is then stabilized by the effect of generator 45. Further adjustment of arm 53 may be made to set the speed of the driven member 43.

After the speed has been set, the regulator operates to maintain the speed substantially constant. If the speed increases, the speed responsive voltage increases, thereby reducing the voltage differential and the current through control winding 5. This in turn results in a greater reactor impedance, a lower current and a consequent reduction of load current. The decreased clutch field excitation causes increased slip at the clutch so that the driven member returns to the desired speed.

The embodiment of the invention in an eddy-current brake or dynamometer is shown in Fig. 2. In this connection a dynamometer is to be considered as a form of brake. The arrangement of parts is generally the same as for Fig. 1 with the exceptions indicated in Fig. 2, wherein like parts are given the same reference numerals. The clutch driven member is replaced by a relatively fixed but slightly swinging stator or dynamometer carcass 143. Also, the generator 45 is driven with the member 41 and prime mover P. The field winding 37 provides the coupling magnetic field. The significant difference is in the relation of the reference voltage and the speed responsive voltage. In this embodiment, the latter overcomes the former to provide current flow in a clockwise direction (electron theory). The rectifier or valve 157 is in a reversed direction to permit clockwise current flow.

The operation is as before, except that when the member 41 speeds up the generator supplies more current to the control winding 5 which results in more current being fed to the field coil 37. The increased excitation of coil 37 tends to return member 41 to the desired speed by development of more resisting torque. The torque developed by the brake is reduced by moving arm 53 away from the 0 position to reduce the voltage differential and the current to the control winding.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A speed regulator for dynamoelectric apparatus having a D. C. field coil and a rotary member the speed of which is controlled by said field coil, comprising a saturable reactor having a main winding and a control winding, an A. C. source and a bridge rectifier in series with said main winding, a capacitance in parallel with said main winding having a reactance equal to the reactance of the main winding when the control winding is deenergized, a reactive impedance in parallel with and by-passing the input of the bridge rectifier, the output of said bridge rectifier being fed to said field coil, and a speed responsive D. C. source feeding direct current to said control winding, said D. C. source providing a voltage proportional to the speed of the rotary member of said dynamoelectric apparatus.

2. A speed regulator for an electromagnetic clutch having a driving member, a driven member and a field coil controlling their electromagnetic coupling, comprising a saturable reactor having a main winding and a control winding, an A. C. source and a bridge rectifier in series with said main winding, a capacitance paralleled across said main winding, a relatively low reactive impedance paralleled across and by-passing the input of the bridge rectifier, the output of said bridge rectifier being fed to said field coil, an adjustable reference voltage source and a speed responsive voltage source in opposition to one another and in series with said control winding, said speed responsive voltage source providing a voltage proportional to the speed of the driven member of the clutch, and an electric valve permitting current flow only when the reference voltage exceeds the speed responsive voltage.

3. A speed regulator for an electromagnetic brake having a rotary member, a relatively stationary member and a field coil controlling their electromagnetic braking action, comprising a saturable reactor having a main winding and a control winding, an A. C. source and a bridge rectifier in series with said main winding, a capacitance paralleled across said main winding, a relatively low reactive impedance paralleled across and by-passing the input of the bridge rectifier, the output of said bridge rectifier being fed to said field coil, an adjustable reference voltage source and a speed responsive voltage source in opposition to one another and in series with said control winding, said speed responsive voltage source providing a voltage proportional to the speed of the rotary member of the brake, and an electric valve permitting current flow only when the speed responsive voltage exceeds the reference voltage.

4. A speed regulator for an electric slip coupling having driving, driven and field members; comprising a saturable reactor having a main winding and a control winding, an A. C. source and a bridge rectifier in series with said main winding, a capacitance in parallel with said main winding, a reactive impedance in parallel with and by-passing the input of the bridge rectifier, the output of said bridge rectifier being fed to the field member, and a generator driven by said driven member of the slip coupling feeding direct current to the control winding.

5. A speed regulator for an electric brake having an electrically braked driving member and a field member; comprising a saturable reactor having a main winding and a control winding, an A. C. source and a bridge rectifier in series with said main winding, a capacitance in parallel with said main winding, a reactive impedance in parallel with and by-passing the input of the bridge rectifier, the output of said bridge rectifier being fed to the field member, and a generator driven by said driving member of the brake feeding direct current to the control winding.

6. A regulator for variably supplying D. C. power to a load and having a minimum output closely approaching zero, comprising a saturable core reactor having a main winding and a control winding, an A. C. source and a rectifier in series with said main winding, a capacitance in parallel with said main winding having a reactive impedance substantially equal to the reactive impedance of the main winding when the control winding is deenergized, a capacitor in parallel with the input of the rectifier, a load connected across the output of the rectifier, and means for variably energizing the control winding of the saturable reactor.

7. In control apparatus for an electromagnetic slip coupling or like apparatus having a rotary member and a variably excitable field coil controlling the speed of said rotary member, a saturable reactor having a main winding supplying said field coil and having a control winding, an A. C. source, a capacitor parallel across said main winding, the output of said main winding being fed to said field coil, an adjustable reference voltage source and a speed responsive voltage source in opposition to one another and in series with the control winding, said speed responsive source including a generator driven by said rotary member, said capacitor having a reactance substantially equal to the reactance of said main winding when the control winding is deenergized, whereby the field coil may be substantially deenergized.

8. In control apparatus as set forth in claim 7, the provision of a rectifier in series with the adjustable and speed responsive voltage sources and the control winding of the reactor.

9. In control apparatus as set forth in claim 8, the provision of a second rectifier, said main winding feeding to said second rectifier and said second rectifier feeding to said field coil.

10. In control apparatus as set forth in claim 7, the provision of a bridge rectifier, said main winding feeding to said bridge rectifier and said bridge rectifier feeding to said field coil, and a relatively low impedance connected across the input to said bridge rectifier, adapted further to effect deenergization of said field coil when the control winding is deenergized.

RALPH L. JAESCHKE.

REFERENCES CITED

The following references are of record in the file of this patent:

UNITED STATES PATENTS

| Number | Name | Date |
|---|---|---|
| 1,710,755 | West | Apr. 30, 1929 |
| 1,870,093 | Boyajian | Aug. 2, 1932 |
| 2,261,083 | Harrison | Oct. 28, 1941 |
| 2,278,151 | Runaldue | Mar. 31, 1942 |
| 2,285,195 | Edwards | June 2, 1942 |
| 2,286,777 | Winthers | June 16, 1942 |

OTHER REFERENCES

"Saturating Core Devices," by Leonard R. Crow, published 1949 by The Scientific Book Publishing Co., Vincennes, Indiana, pages 104 and 105.